(12) United States Patent
Hosseini et al.

(10) Patent No.: US 12,332,511 B2
(45) Date of Patent: Jun. 17, 2025

(54) METHOD OF FORMING A PATTERN ON AN OPTICAL DEVICE

(71) Applicant: E INK CORPORATION

(72) Inventors: Peiman Hosseini, Oxon (GB); Lokeshwar Bandhu, Oxford (GB); Ben Broughton, Oxford (GB)

(73) Assignee: E Ink Corporation, Billerica, MA (US)

( * ) Notice: Subject to any disclaimer, the term of this patent is extended or adjusted under 35 U.S.C. 154(b) by 538 days.

(21) Appl. No.: 17/772,168

(22) PCT Filed: Oct. 21, 2020

(86) PCT No.: PCT/GB2020/052635
§ 371 (c)(1),
(2) Date: Apr. 27, 2022

(87) PCT Pub. No.: WO2021/084228
PCT Pub. Date: May 6, 2021

(65) Prior Publication Data
US 2022/0382081 A1    Dec. 1, 2022

(30) Foreign Application Priority Data

Oct. 28, 2019 (GB) ...................................... 1915606

(51) Int. Cl.
*G02F 1/01* (2006.01)
*B41J 2/21* (2006.01)

(52) U.S. Cl.
CPC .............. *G02F 1/0147* (2013.01); *B41J 2/21* (2013.01)

(58) Field of Classification Search
CPC ..................... G02F 1/0147; B41J 2/21

USPC .......................................... 359/288
See application file for complete search history.

(56) References Cited

U.S. PATENT DOCUMENTS

| | | | |
|---|---|---|---|
| 5,485,183 | A | 1/1996 | Zandian et al. |
| 6,556,470 | B1 | 4/2003 | Vincent et al. |
| 9,323,044 | B2 | 4/2016 | Feenstra et al. |
| 9,823,538 | B2 | 11/2017 | Bhaskaran et al. |
| 10,068,606 | B2 | 9/2018 | Bhaskaran et al. |

(Continued)

FOREIGN PATENT DOCUMENTS

| | | |
|---|---|---|
| JP | 2007095274 A | 4/2007 |
| WO | 2015097469 A2 | 7/2015 |

(Continued)

OTHER PUBLICATIONS

Hosseini, Peiman et al., "An optoelectronic framework enabled by low-dimensional phase-change films", Nature, vol. 511, No. 7508, pp. 206-211, (Jul. 9, 2014). Jul. 9, 2014.

(Continued)

*Primary Examiner* — William Choi
(74) *Attorney, Agent, or Firm* — Brian D. Bean

(57) ABSTRACT

A pattern is formed on an optical device, where the optical device includes a plurality of pixel elements. Each pixel element has a stack of layers that includes a colour control layer and a brightness control layer superposed over each other. For each of one or more of the pixel elements: energy is deposited into the colour control layer to change an effect of the colour control layer on the colour of light, and energy is deposited into the brightness control layer to change an effect of the brightness control layer on the intensity of light.

18 Claims, 5 Drawing Sheets

(56) References Cited

U.S. PATENT DOCUMENTS

| | | |
|---|---|---|
| 10,718,987 B2 | 7/2020 | Hosseini et al. |
| 10,884,267 B2 | 1/2021 | Bhaskaran et al. |
| 10,884,314 B2 | 1/2021 | Broughton et al. |
| 11,215,852 B2 | 1/2022 | Hosseini et al. |
| 2016/0334647 A1 | 11/2016 | Lin et al. |
| 2020/0202804 A1 | 6/2020 | Garcia et al. |
| 2020/0209059 A1 | 7/2020 | Sarwat et al. |

FOREIGN PATENT DOCUMENTS

| | | | |
|---|---|---|---|
| WO | WO-2015097468 A1 * | 7/2015 | ......... G02B 27/2278 |
| WO | WO-2016125491 A1 * | 8/2016 | ........... G02B 26/007 |

OTHER PUBLICATIONS

Kaino, Yuriko et al., "Laser-addressed full-color photo-quality rewritable sheets based on thermochromic systems with luco dyes", J Soc Inf Display, vol. 27, No. 5, pp. 295-303, (Apr. 11, 2019). Apr. 11, 2019.

Talagrand, Clement et al., "Solid-state reflective displays (SRD®) for video-rate, full color, outdoor readable displays", Journal of the Society for Information Display, vol. 26, No. 10, pp. 619-624, (Oct. 2018). Oct. 2018.

* cited by examiner

METHOD OF FORMING A PATTERN ON AN OPTICAL DEVICE

This application is the U.S. national phase of International Application No. PCT/GB2020/052635 filed Oct. 21, 2020 which designated the U.S. and claims priority to Great Britain Patent Application No. 1915606.6 filed Oct. 28, 2019, the entire contents of each of which are hereby incorporated by reference.

The present invention relates to methods of forming a pattern on an optical device, particularly an optical device that uses a phase change material to control a spectral content of light reflected from the device.

Phase change materials (PCMs) are materials which may be reversibly switchable between two stable, solid but structurally distinct states, typically an amorphous and a crystalline solid state, which have differing optical (e.g. complex refractive index) and electrical (e.g. conductivity) properties, via the application of energy to the material. Such materials have found industrial application in optical storage media, for example CD-RW and DVD-RW computer re-writable optical discs, in which the energy for switching is supplied by a laser directed at a PCM layer, and also in electronic "flash" type non-volatile memory devices such as PC-RAM, in which the energy is delivered via electric current and/or joule heating.

While laser writing, erasing and re-writing of data into a PCM based optical storage device such as DVD-RW has been well developed and commercialised, the stored data in these devices is written as sub-micron scale dots each representing a bit of data, and a probe laser is required to detect this data using a difference in optical reflectivity from amorphous and crystalline regions at the probe laser wavelength. The desirability of using the same optical control to enable laser writing of images viewable by the naked eye has also been expressed, in e.g. Japanese patent application JP2007095274A. However, industrial applicability of such designs has been held back by several shortcomings including the following.

i) PCM based devices developed for optical storage have low optical contrast between the two stable states when illuminated by broad spectral band light typical of indoor and outdoor ambient conditions, as a result of being developed for providing optical contrast at the specific wavelength of the intended probe laser only.

ii) The PCMs themselves (i.e. the specific composition or alloy used, typically a chalcogenide glass and most usually an alloy of Ge, Sb and Te (GST)) are developed to have fast crystallisation times, so as to maximise the speed of laser writing and erasing of data. The fast crystallisation times limit the area of material which may be re-amorphised with a single pulse. This is not an issue in data storage applications where small spot size is advantageous for high data density, but is a severe limitation for laser writing of visible size images where each pixel should be of a scale at least exceeding the human visual system acuity limit at the intended viewing distance.

iii) PCM devices with a single layer of PCM material, forming part of an optical stack which is uniform across the device area, as is typical with DVD-RW devices, may only be switched between two stable states with different optical reflectivity. An image formed using equivalent devices and methods would therefore comprise only two colours.

EP3087562B1 and publication 'Hosseini, P. et al. "An optoelectronic framework enabled by low-dimensional phase-change films" Nature, 511, pp 206-211 (2014)' disclose a means of providing a rewritable PCM based thin-film optical stack with high optical contrast between the two stable states, a wide range of selectable colours, and bright, vivid reflected colour capability for each of the states by means of introducing a spacer layer with carefully controlled thickness between the PCM layer and the reflector layer, effectively overcoming limitation i).

WO2017134506A1 and United Kingdom patent application number GB1821051.8 respectively disclose a means of electrically switching larger areas of phase change material, and PCM material compositions compatible for this increased switching area, effectively overcoming limitation ii).

WO2016125491A1 and WO2017134506A1 disclose PCM based optical devices using a stack design from EP3087562B1 to create electrically updateable reflective displays, in which different regions of the display (sub-pixels) are provided with thin-film optical stacks of different layer thicknesses and/or material sets so as to provide an increased range of reflected colour capability from the device as a whole. WO2016125491A1 discloses the use of an additional active, electrically controllable top-shutter layer to selectively absorb light incident on, and reflected by, any given sub-pixel to a controllable extent so as to provide full colour control and greyscale of the resultant image, effectively overcoming limitation iii) for the case of devices with built-in electronics for dynamically updating the image.

Publication 'Kaino, Y. et al. "Laser-addressed full-color photo-quality rewritable sheets based on thermochromic systems with leuco dyes". J Soc Inf Display; 27: 295-303 (2019)' describes a laser re-writable colour reflected image device in which three layers of optically switchable leuco dye material are provided in each image region, each layer having different optical absorption in one or both of the states, so a full colour image may be written and re-written to the device by three lasers of different wavelength.

Publication 'Talagrand, C. et al. "Solid-state reflective displays (SRD®) for video-rate, full color, outdoor readable displays." Journal of the Society for Information Display, 26, 10, pp 619-624 (2018)' describes a reflective colour static image reproduction device in which the colour reflected by each image region (sub-pixel) of the device is set to one of two available states by selective crystallisation of a PCM layer in a thin-film optical stack and the luminance of each image region is determined by selectively obscuring a portion of the area of each sub-pixel with an overlaying black mask layer. The image produced by this device is not customisable or reconfigurable however, as the crystallisation state of each PCM region, and the area coverage of the black mask are permanently pre-set during fabrication.

It is an object of the invention to provide alternative ways of forming a pattern in an optical device.

According to an aspect, there is provided a method of forming a pattern on an optical device, wherein: the optical device comprises a plurality of pixel elements, each pixel element comprising a stack of layers that includes a colour control layer and a brightness control layer superposed over each other in a viewing direction; and the method comprises, for each of one or more of the pixel elements: depositing energy into the colour control layer of the pixel element to modify the colour control layer and thereby change an effect of the colour control layer on the colour of light leaving the optical device from the pixel element in use; and depositing energy into the brightness control layer of the pixel element to modify the brightness control layer and thereby change an effect of the brightness control layer on the intensity of light leaving the optical device from the pixel element in use.

Thus, a method is provided which allows a highly customizable pattern to be formed in an optical device via two independently modifiable layers in each of plural pixel elements. The customization may provide a full-colour image that is viewable by a human eye or via magnification equipment. The approach may be applied to forming films with customisable images, updatable signage (where the brightness control layer and the colour control layer are configured to be rewritable), optical storage media, and optical security marks.

In an embodiment, the modification of the brightness control layer is different in at least three different pixel elements, causing the brightness of light from the at least three different pixel elements to have three different respective values. The method thus provides more than binary (on/off) control of the pixel elements, thereby allowing a wide range of visual effects to be achieved.

In an embodiment, each different modification of the brightness control layer is performed by changing a transmittance with respect to visible light of a different respective proportion of the brightness control layer in the pixel element. This approach allows for easy and efficient implementation, including allowing use of material in the brightness control layer that only needs to be switchable in a binary way (locally).

In an embodiment, the changing of the transmittance of only a portion of the brightness control layer in the pixel element comprises removing the portion of the brightness control layer. Providing the local binary switching by removal (e.g. using laser-induced ablation) can be implemented simply and efficiently. Laser ablation can routinely be applied at high spatial resolutions.

In an embodiment, each modification of the brightness control layer in the pixel element comprises uniform modification of the whole of the brightness control layer in the pixel element. Providing three or more different transmittances uniformly over respective different pixel elements can be implemented using materials that can be tuned through three or more different transmittance states and reduces the need for high spatial resolution deposition of energy in comparison to approaches where the transmittance level is controlled by controlling a proportion of the brightness control layer that is modified in each pixel element (e.g. by removing only a selected portion of the brightness control layer).

In an embodiment, the depositing of energy into the colour control layer is performed by irradiating the colour control layer and the depositing of energy into the brightness control layer is performed by irradiating the brightness control layer. Irradiation allows the energy to be deposited quickly and accurately.

In an embodiment, for each of one or more of the pixel elements, the irradiation of the brightness control layer is spatially non-uniform within the pixel element. Providing spatially non-uniform irradiation within a pixel element allows the brightness control layer within the pixel element to be modified non-uniformly, for example to remove only a selected portion of the brightness control layer in the pixel element.

In an embodiment, the irradiation of the colour control layer to modify the colour control layer is performed through the brightness control layer prior to the modification of the brightness control layer. In an embodiment, the irradiation of the colour control layer is performed using radiation that modifies the colour control layer without modifying the brightness control layer. This approach allows both the colour control layer and the brightness control layer to be modified via irradiation from the same side of the optical device, thereby allowing the method to be performed using simpler and/or more compact hardware.

In an embodiment, the irradiation of the colour control layer is performed from a first side of the optical device; and the irradiation of the brightness control layer is performed from a second side of the optical device, opposite to the first side. Irradiating from opposite sides reduces the risk of interference between the modification of the colour control layer and the modification of the brightness control layer, thereby increasing flexibility for configuring the irradiation for the two different operations.

In an embodiment, the stack of layers in each pixel element further comprises a reflective layer and a spacer layer between the reflective layer and the colour control layer; the brightness control layer of each stack is provided on a side of the colour control layer opposite to the reflective layer; and the first side of the optical device is on the side of the reflective layer opposite to the colour control layer. In an embodiment,
the irradiating of the colour control layer from the first side of the optical device comprises depositing energy into the reflective layer, the reflective layer acting to spread the energy as heat laterally within the reflective layer. Spreading the energy laterally reduces the risk of incomplete or otherwise erroneous actuation of pixel elements.

In an embodiment, the reflective layer is patterned to at least partially isolate a reflective region corresponding to each of two or more of the pixel elements from reflective regions corresponding to pixel elements other than that pixel element. The patterning reduces the risk of cross-talk between different pixel elements during writing of a pattern to the optical device.

In an embodiment, the phase change material is provided as a plurality of sub-layers of phase change material in each of two or more of the pixel elements. In embodiments of this type, by depositing energy selectively into different combinations of the sub-layers in different pixel elements it is possible to achieve a wide variety of optical effects. For example, a single pixel element type can be switched in this way to provide options that might only otherwise be available using different pixel element types: for example, the single pixel element type could be selectively made to switch between white and each of a plurality of different colours (e.g. three different colours or more) and/or to switch between another colour than white and each of a plurality of different colours (e.g. three different colours or more). Providing a single pixel element type having this wider flexibility reduces or eliminates the need to have pixel elements of multiple different pixel element type in order to achieve a desired colour capability, thus simplifying manufacture.

In an embodiment, the pixel elements are provided as a plurality of groups and each group of pixel elements comprises at least two pixel elements that are configured to provide a different range of effects on the colour of light leaving the optical device from the pixel element. Providing such groups ensures a wide range of effects can be achieved, such as formation of a full colour and high contrast pattern.

In an embodiment, either or both of the colour control layer and the brightness control layer are configured to be reversibly modifiable. A pattern may thus be formed that is reconfigurable.

According to an alternative aspect, there is provided a method of forming a pattern on an optical device comprising a plurality of pixel elements, the method comprising: providing an ink comprising a liquid medium and a suspension of micro-stacks comprising phase change material, the phase change material being switchable between a plurality of stable states having different refractive indices relative to each other; and printing the ink in a pattern to form a colour control layer in each of the pixel elements.

Providing the phase change material in an ink allows the phase change material to be deposited only where it is needed in the final device, thereby reducing waste in comparison to alternative patterning techniques where phase change material is selectively removed or blocked by a mask. The approach allows non-planar objects to be coated more reliably and/or efficiently. The approach allows different stacks to be formed close to each other without needing lithography. For example, stacks to provide a full colour display could all be printed rather than requiring separate sputtering, litho and etching steps for each primary colour.

According to an alternative aspect, there is provided a method of forming a pattern on an optical device, wherein: the optical device comprises a plurality of pixel elements, each pixel element comprising a stack of layers that includes at least a colour control layer; and the method comprises, for each of one or more of the pixel elements, depositing energy into the colour control layer of the pixel element to modify the colour control layer and thereby change an effect of the colour control layer on the colour of light leaving the optical device from the pixel element in use; the colour control layer comprises a phase change material switchable between a plurality of stable states having different refractive indices relative to each other; the depositing of energy into the colour control layer of each pixel element is arranged to switch the colour control layer in the pixel element from one of the states to another of the states; and the phase change material is provided as a plurality of sub-layers of phase change material in each of two or more of the pixel elements.

This approach allows energy to be deposited selectively into different combinations of the sub-layers in different pixel elements to provide a wider variety of visual effects than would be possible otherwise. For example, the sub-layers may be configured such that it is possible to switch a single pixel element type selectively into more than two different colours. Providing a single pixel element type having this wider flexibility reduces or eliminates the need to have pixel elements of multiple different pixel element type in order to achieve a desired colour capability, thus simplifying manufacture.

The invention will now be further described, by way of example, with reference to the accompanying drawings, in which.

Figure 11:
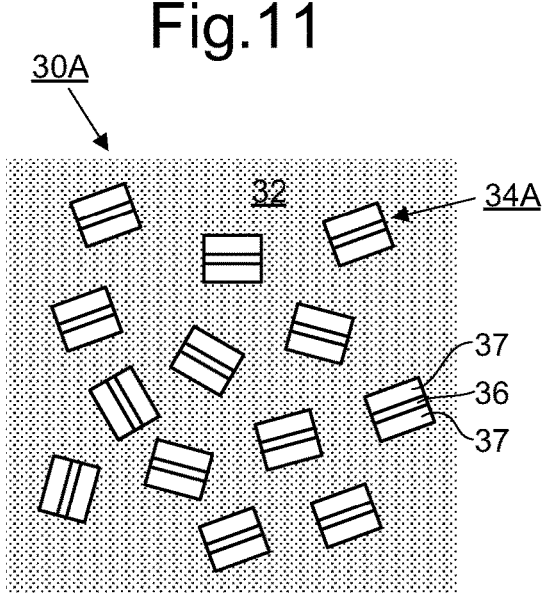
Figure 12:
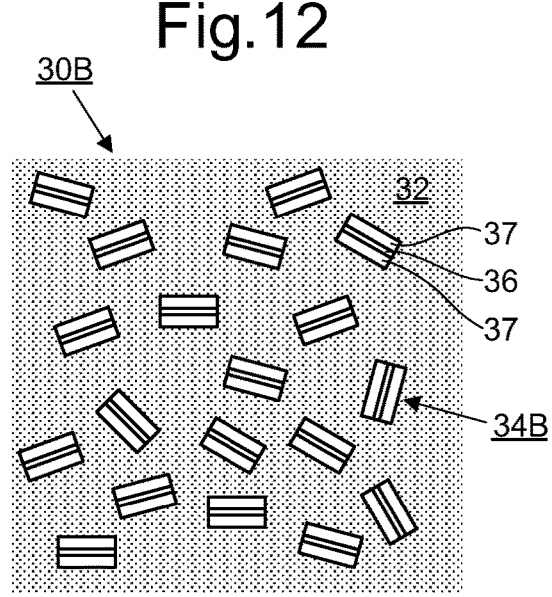
Figure 13:
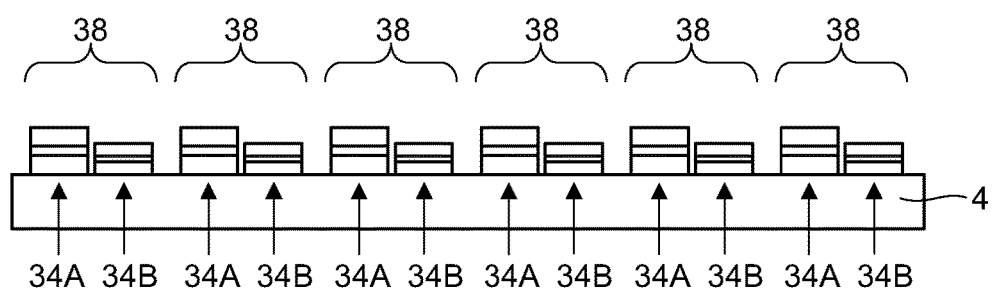

FIGS. 11 and 12 schematically depict suspensions of micro-stacks in two different inks; and FIG. 13 is a side sectional view depicting example pixel elements printed using the inks of FIGS. 11 and 12.

Throughout this specification, the terms "optical" and "light" are used, because they are the usual terms in the art relating to electromagnetic radiation, but it is understood that in the context of the present specification they are not limited to visible light. It is envisaged that the invention can also be used with wavelengths outside of the visible spectrum, such as with infrared and ultraviolet light.

Figure 1:
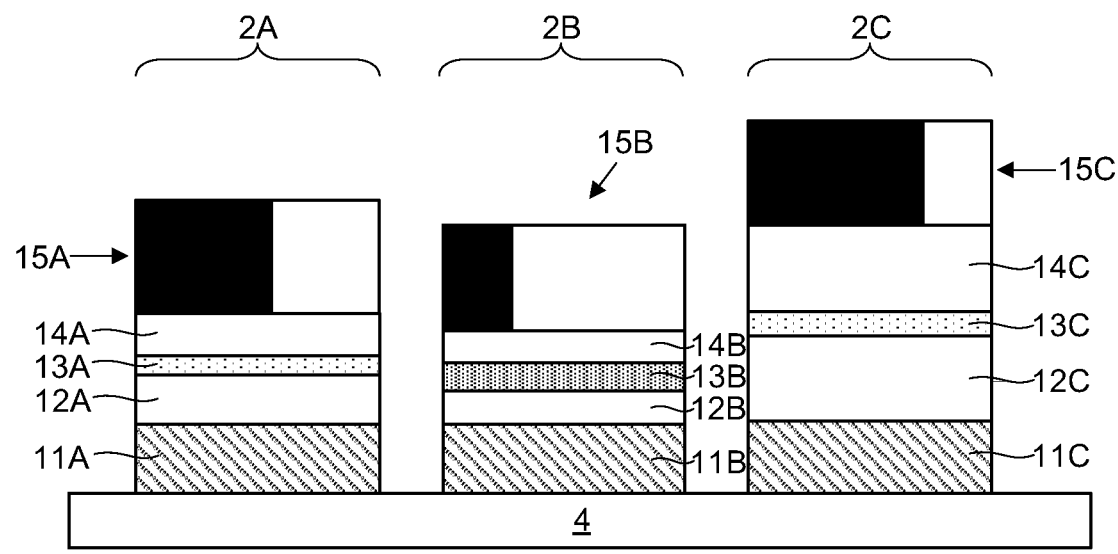
FIG. 1 is a side sectional view of a group of three pixel elements of an optical device.

The disclosure provides methods of forming a pattern on an optical device. The optical device comprises a plurality of pixel elements. FIG. 1 depicts an example group of three of the pixel elements 2A-2C. Each pixel element 2A-2C comprises a stack of layers (e.g. a thin-film optical stack) on a substrate 4. In some embodiments the substrate 4 is a flexible film. Each stack of layers comprises a colour control layer 13A-13C and a brightness control layer 15A-15C. The colour control layer 13A-13C and brightness control layer 15A-15C of each pixel element 2A-2C are superposed over each other in a viewing direction. The superposition means that light exiting each pixel element 2A-2C does so after passing through both of the colour control layer 13A-13C and the brightness control layer 15A-15C of the pixel element 2A-2C.

In an embodiment, the following two steps are performed for each of one or more of the pixel elements 2A-2C (optionally for all of the pixel elements 2A-2C).

In a first step of the two steps, energy is deposited into the colour control layer 13A-13C of the pixel element 2A-2C. In some embodiments, the depositing of energy into the colour control layer 13A-13C is performed by irradiating the colour control layer 13A-13C. In an embodiment, the energy is deposited using an external device (e.g. a laser). The deposition of energy modifies the colour control layer 13A-13C and thereby changes an effect of the colour control layer 13A-13C on the colour (e.g. spectral shape) of light leaving the optical device from the pixel element 2A-2C in use. The modification may, for example, change a complex refractive index of the colour control layer 13A-13C, as discussed below.

In a second step of the two steps, energy is deposited into the brightness control layer 15A-15C of the pixel element 2A-2C. The depositing of energy into the brightness control layer 15A-15C may be performed at a different time to the depositing of energy into the colour control layer 13A-13C. The second step may thus be performed before, during, or after the first step. In some embodiments, the depositing of energy into the brightness control layer 15A-15C is performed by irradiating the brightness control layer 15A-15C. In an embodiment, the energy is deposited using an external device (e.g. a laser). The deposition of energy modifies the brightness control layer 15A-15C and thereby changes an effect of the brightness control layer on the intensity (or spectral power) of light leaving the optical device from the pixel element 2A-2C in use.

In an embodiment, the colour control layer 13A-13B comprises a PCM switchable (optionally reversibly) between a plurality of stable states having different complex refractive indices relative to each other. The depositing of energy into the colour control layer 13A-13C of each pixel element 2A-2C may be arranged in this example to switch the colour control layer 13A-13C in the pixel element 2A-2C from one of the stable states to another of the stable states. Detailed examples of how switching of a PCM layer can be used to provide changes in perceived colour of pixels are described in 'Hosseini, P. et al. "An optoelectronic framework enabled by low-dimensional phase-change films" Nature, 511, pp 206-211 (2014), and any of the mechanisms described therein may be used with embodiments of the present disclosure.

In an embodiment, the PCM in each pixel element 2A-2C is switchable between a set of optical states comprising at least two optical states which cause the pixel element 2A-2C to have different colours. In an embodiment, the different colours include red and white, blue and white, or green and white. In an embodiment each of the pixel elements 2A-2C in the group of FIG. 1 is configured to be switchable between a different set of colours via switching of the PCM in the pixel element 2A-2C. For example, switching of the PCM in pixel element 2A may allow switching between white and a first colour, switching of the PCM in pixel element 2B may allow switching between white and a second colour, and switching of the PCM in pixel element 2C may allow switching between white and a third colour. In an embodiment, the first, second and third colours are different. In an embodiment, the first colour is red, the second colour is blue and the third colour is green. Each of the pixel elements 2A-2C in the group of FIG. 1 may thus act as sub-pixels of a single pixel. Independent control of the colour control layer 13A-13C and the brightness control layer 15A-15C of each of the pixel elements 2A-2C provides full colour and intensity control of the single pixel.

Variations on the above are possible. For example, four or more pixel element types may be provided, which may allow a wider range of effects to be achieved. The different colours may include red and white, blue and white, green and white and a fourth colour and white, and/or cyan, magenta and/or yellow each switching to white. Also, rather than a pure white, the secondary colour state of each pixel element type may be a paler (i.e. more highly reflective, less colour saturated) colour of the same or similar hue to the initial state, or a state of entirely different colour hue and/or brightness.

Figure 2:
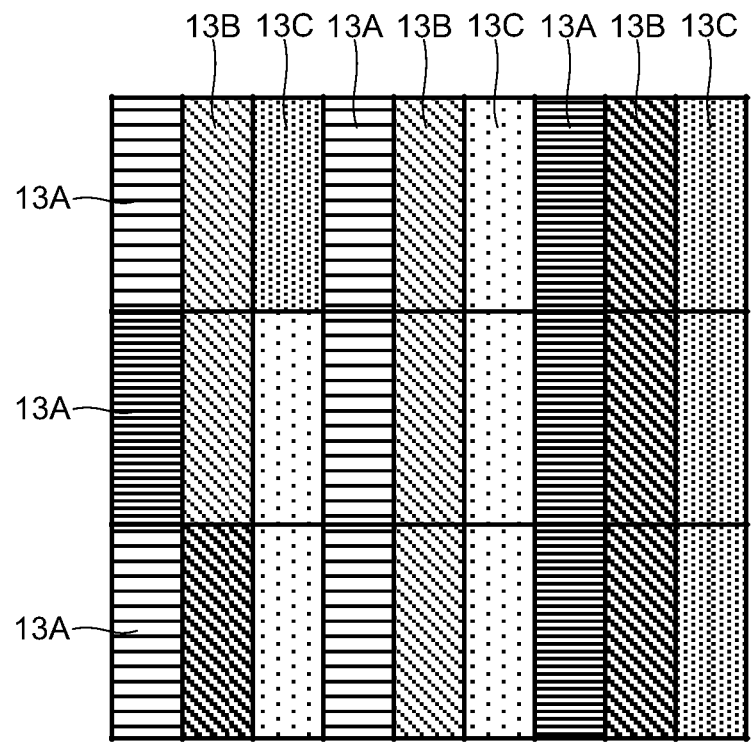
FIG. 2 is a front view of colour control layers in a 3×3 array of groups of three pixel elements of the type depicted in FIG. 1.
Figure 3:
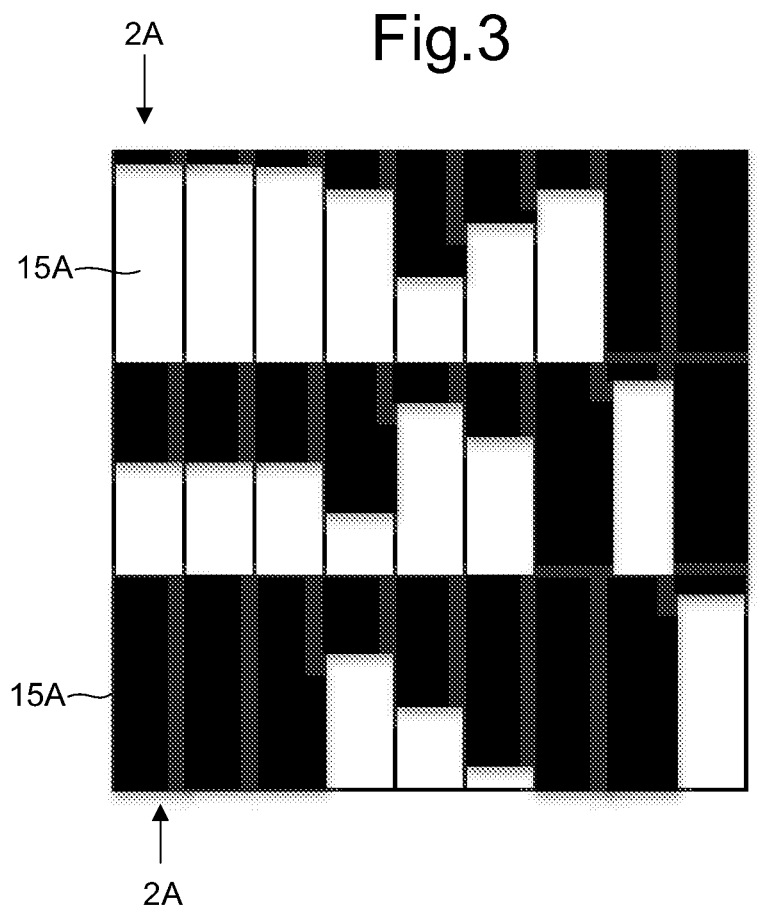
FIG. 3 is a front view of brightness control layers in a 3×3 array of groups of pixel elements of the type depicted in FIG. 1.
Figure 4:
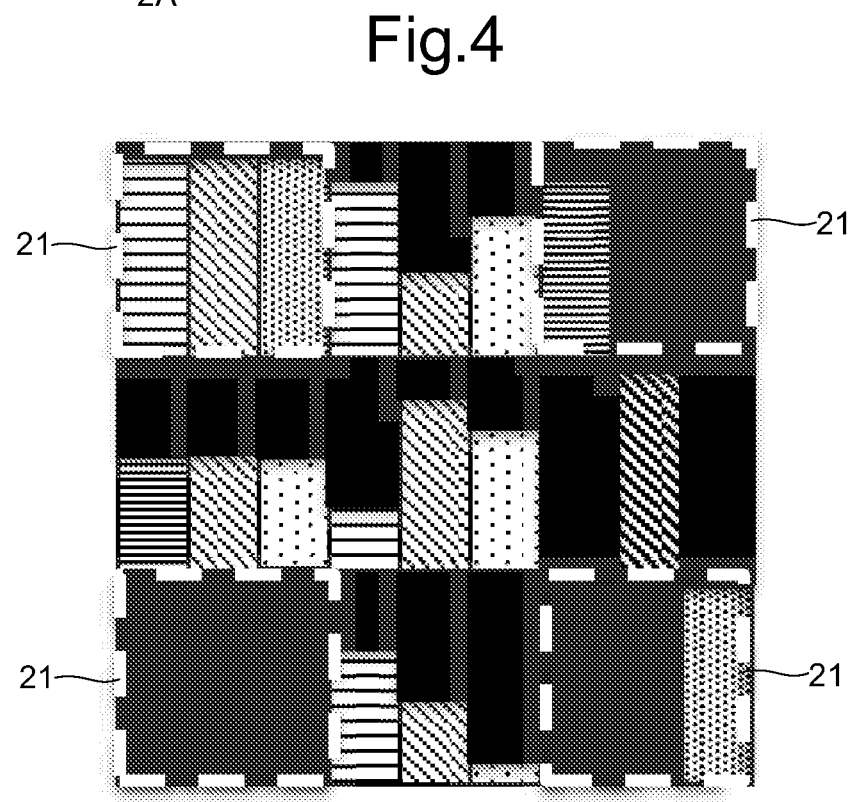
FIG. 4 is a front view showing superposition of the colour control layers of FIG. 2 with the brightness control layers of FIG. 3.

In some embodiments, as exemplified in FIG. 1, the stack of layers in each pixel element 2A-2C comprises a reflective layer 11A-11C and a spacer layer 12A-12C between the reflective layer 11A-11C and the colour control layer 13A-13C. In some embodiments, a capping layer 14A-14C is further provided on an opposite side of the colour control layer 13A-13C to the reflective layer 11A-11C. In some embodiments, as exemplified in FIG. 1, the pixel elements 2A-2C are provided as a plurality of groups (e.g. a plurality of the groups of FIG. 1, as depicted in FIGS. 2-4). Each group of pixel elements 2A-2C may comprise at least two pixel elements having spacer layers of different thickness. This modifies interference effects with the stack such that each of the pixel elements 2A-2C in the group provides a different range of effects on the colour of light leaving the optical device from the pixel element 2A-2C than the other pixel element or pixel elements in the group. In the example discussed above, the spacer layer 13A in pixel element 2A may be configured to provide the switching between white and red, the spacer layer 13B in pixel element 2B may be configured to provide the switching between white and blue, and the spacer layer 13C in pixel element 2C may be configured to provide the switching between white and green. More complicated arrangements are also possible to achieve additional optical effects and/or a wider variety of different pixel element types, including: additional colour control layers (comprising PCM), optionally provided such that there is an alternating stack of PCM layers and spacer layers; additional spacer layers (optionally of different thicknesses and/or in different locations); additional capping layers (optionally of different thicknesses and/or in different locations; and/or additional optically active layers such as passive absorber layers (optionally in different locations). A specific example in which the PCM in each of two or more of the pixel elements is provided as a plurality of sub-layers of PCM (optionally separated from each other by a non-PCM layer) is described further below.

FIG. 2 is a front view of colour control layers in a 3×3 array of groups of pixel elements 2A-2C of the type depicted in FIG. 1. The distribution of different shading in the colour control layer 13A-13C in the 81 pixel elements exemplifies a possible configuration of the groups after energy has been selectively deposited in the pixel elements 2A-2C to form a desired pattern on the optical device.

FIG. 3 is a front view of brightness control layers in a 3×3 array of groups of pixel elements 2A-2C of the type depicted in FIG. 1. Regions shown in white represent regions of high transparency (e.g. having a transmittance with respect to visible light of at least 90%, optionally at least 99%) and regions shown in black represent regions of low transparency (e.g. having a transmittance with respect to visible light of less than 10%, optionally less than 1%).

The modification of the brightness control layer 15A-15C can be different in at least three different pixel elements 2A-2C (in the same group and/or between different groups), causing the brightness of light from the different pixel elements to have different respective values. In some embodiments, as exemplified in FIG. 3, each different modification of the brightness control layer 15A-15C may be performed by changing a transmittance with respect to visible light of a different respective proportion of the brightness control layer 15A-15C in the pixel element 2A-2C. In the example of FIG. 3, this results in an amount of light leaving the pixel element 2A-2C after reflection being determined by relative proportions of regions of high transparency and low transparency in each pixel element 2A-2C, the relative proportions being defined by the modification of the respective brightness control layers 15A-15C. The observed brightness of each pixel element 2A-2C will be high where a region of high transparency in the brightness control layer 15A-15C of the pixel element 2A-2C is larger than a region of low transparency in the brightness control layer 15A-15C of the pixel element 2A-2C (e.g. such as in the brightness control layer 15A of the pixel element 2A in the top left of FIG. 3). The observed brightness of each pixel element 2A-2C will be low where a region of high transparency in the brightness control layer 15A-15C of the pixel element 2A-2C is smaller than a region of low transparency in the brightness control layer 15A-15C of the pixel element 2A-2C (e.g. such as in the brightness control layer 15A of the pixel element 2A in the bottom left of FIG. 3).

In other embodiments, each modification of the brightness control layer 15A-15C in the pixel element 2A-2C comprises uniform modification of the whole of the brightness control layer 15A-15C in the pixel element 2A-2C. In embodiments of this type, the brightness control layer 15A-15C is formed from a material that can be switched between more than two different transmittances. Allowing brightness control to be achieved by such uniform modification avoids the need to provide switching at a spatial resolution finer than the size of each pixel element 2A-2C. In some embodiments of this type, transmittance can be adjusted continuously through a range of values.

In some embodiments, the brightness control layer 15A-15C can be modified reversibly. When the colour control layer 13A-13C is configured to also be reversibly modifiable, the optical device can be fully rewritable. Examples of materials which could provide such a laser re-writeable clear-to-black transition are leuco dyes (as used in the device of publication Kaino, Y. et al. "Laser-addressed full-color photo-quality rewritable sheets based on thermochromic systems with leuco dyes". J Soc Inf Display; 27: 295-303 (2019), mentioned earlier, but in alternative compositions which are not colour specific) and liquid crystal devices with photosensitive alignment layers (which may be based on azo dye materials).

The superposition of the colour control layers 13A-13C and the brightness control layers in the pixel elements 2A-2C, depicted schematically in FIG. 4, provides a desired combination of colour and brightness variation between the pixel elements 2A-2C. As depicted in FIG. 4, each group of three pixel elements 2A-2C may form a pixel 21. Four example pixels are highlighted in FIG. 4 by broken line boxes but it will be appreciated that the 3×3 array of groups of pixel elements 2A-2C shown in FIG. 4 comprises nine individual pixels (each comprising three sub-pixels respectively corresponding to the three pixel elements 2A-2C). By the selective switching of the state of the colour control layer 13A-13C and brightness control layer 15A-15C in each pixel element 2A-2C of each pixel 21 it is possible to produce a wide range a reflected colours and brightness. The optical device as a whole is thereby made capable of reproducing a high quality, high brightness and high spatial resolution image with large colour gamut. For example, a pixel 21 may be configured to have a high brightness white reflectivity by switching the colour control layer 13A-13C of each pixel element 2A-2C of the pixel 21 to its white reflecting state, and switching the brightness control layer 15A-15C of each pixel element 2A-2C to its clear, transmissive state over the full (or maximal) area of each pixel element 2A-2C, as illustrated in the top-left pixel 21 of the 3×3 pixel array of the example in FIG. 4. Alternatively, a pixel 21 may be configured to reflect a vivid, pure red, pure green or pure blue coloured spectrum by switching the colour control layer 13A-13C of each pixel element 2A-2C of the pixel 21 to its vividly coloured reflecting state, and switching the brightness control layer 15A-15C of only the pixel element 2A-2C of the type (e.g. red, green or blue) corresponding to the intended colour of the pixel 21 to its transmissive state over the full area, and leaving the brightness control layer 15A-15C black (minimally transmissive) over the remaining two pixel elements 2A-2C, as illustrated in the top-right, centre-right, and bottom-right pixels of the example in FIG. 4. Alternatively, a pixel 21 may be configured to reflect a neutral grey or black appearance by switching the colour control layer 13A-13C of each pixel element 2A-2C of the pixel 21 to the same state (all to the white state, or all to the vivid colour state), and switching the brightness control layer 15A-15C of each pixel element 2A-2C to its absorbing, dark state over the same area in each pixel element 2A-2C, or the full (or maximal) area of each pixel element 2A-2C, as illustrated in the bottom-left pixel 21 of the 3×3 pixel array of the example in FIG. 4. These examples represent the extreme examples of pixel colour states (e.g. white, black and the primary colours) and may therefore define the extent of the optical device's colour gamut capability, but using the two-layer colour control described with different combinations of pixel elements 2A-2C in their coloured and white state, and intermediate switching of the brightness control layer 15A-15C, any intermediate colour within the available gamut may be produced. Publication Talagrand, C. et al. "Solid-state reflective displays (SRD®) for video-rate, full color, outdoor readable displays." Journal of the Society for Information Display, 26, 10, pp 619-624 (2018) illustrates and quantifies the high quality image reproduction that may be achieved using such two-layer control, also with a PCM containing thin-film optical stack as a colour control layer and a spatially patterned black mask layer as a brightness controlling layer, albeit in a non-customisable, non-reconfigurable static image reproduction device.

Each modification of the brightness control layer 15A-15C will normally change the brightness of the pixel element 2A-2C without changing the colour of the pixel element 2A-2C substantially (or at all). Each modification of the brightness control layer 15A-15C in the pixel element 2A-2C may be restricted for example to changing a transmittance with respect to visible light of the brightness control layer 15A-15C in the pixel element 2A-2C. The mechanism underlying the modification of the brightness control layer 15A-15C and the composition of the brightness control layer 15A-15C will typically therefore be different, respectively, from the mechanism underlying the modification of the colour control layer 13A-13C and the composition of the colour control layer 13A-13C.

The modification of the brightness control layer 15A-15C may be different in at least three different pixel elements 2A-2C, causing the brightness of light from the at least three different pixel elements 2A-2C to have three different respective values. The control of brightness is not therefore necessarily restricted to binary changes. Various mechanisms may be used to provide the brightness control. In the example of FIGS. 3 and 4, as discussed above, the brightness control is provided by controlling the relative sizes of high transparency and low transparency regions.

In some embodiments, the brightness control layer 15A-15C in each pixel element 2A-2C is initially opaque (low transmittance) and the modification of the brightness control layer 15A-15C comprises increasing a transmittance per unit area with respect to visible light, optionally of a selected portion of the brightness control layer 15A-15C, for at least a subset of the pixel elements 2A-2C. The brightness control layer 15A-15C may for example be provided as a black mask curable resist material. The increase in transmittance may be implemented by selectively evaporating/ablating the brightness control layer 15A-15C. Thus, the transmittance of only a portion of the brightness control layer 15A-15C in a pixel element may be modified by removing that portion of the brightness control layer 15A-15C. Alternatively, the increase in transmittance may be implemented by bleaching the brightness control layer 15A-15C to a clear state. A spatial resolution with which the brightness control layer 15A-15C may be evaporated/ablated or bleached is high enough to allow intermediate control of the brightness (greyscale) in a selected pixel element 2A-2C by only switching a portion of the brightness control layer 15A-15C of that pixel element 2A-2C.

Figure 5:
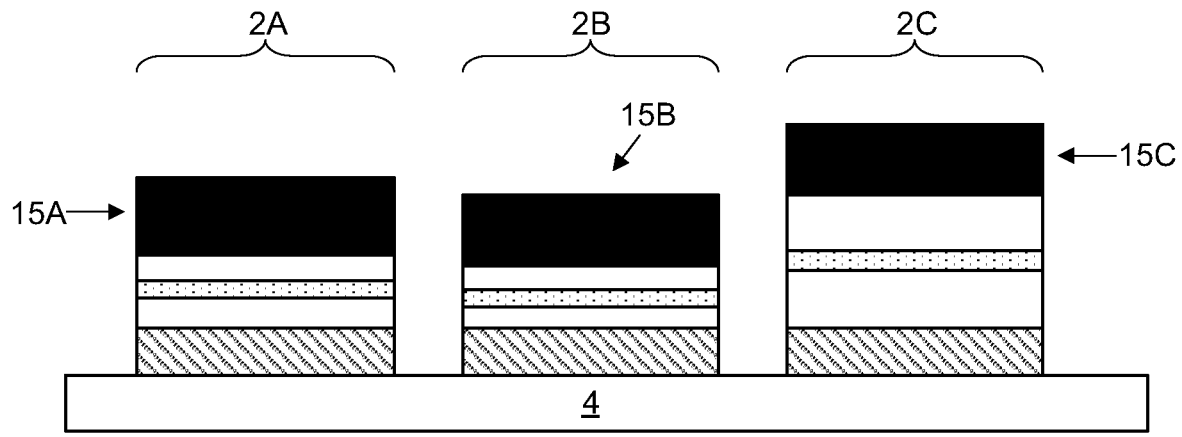
FIGS. 5-7 are side sectional views of a group of three pixel elements of an optical device depicting an example process flow for forming a pattern in the optical device by irradiation of colour control layers and brightness control layers starting from opaque brightness control layers.
Figure 6:
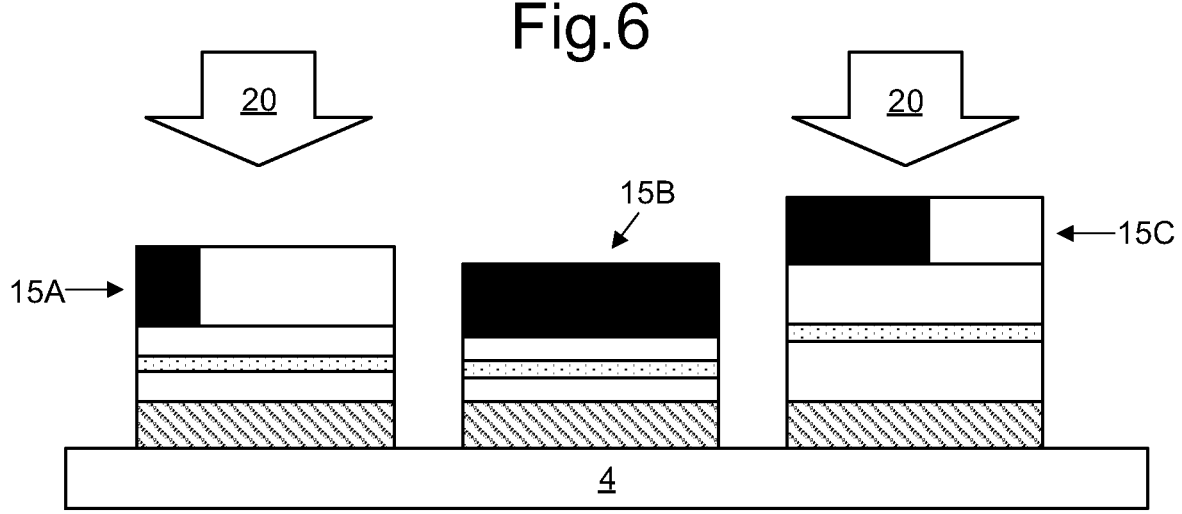
Figure 7:
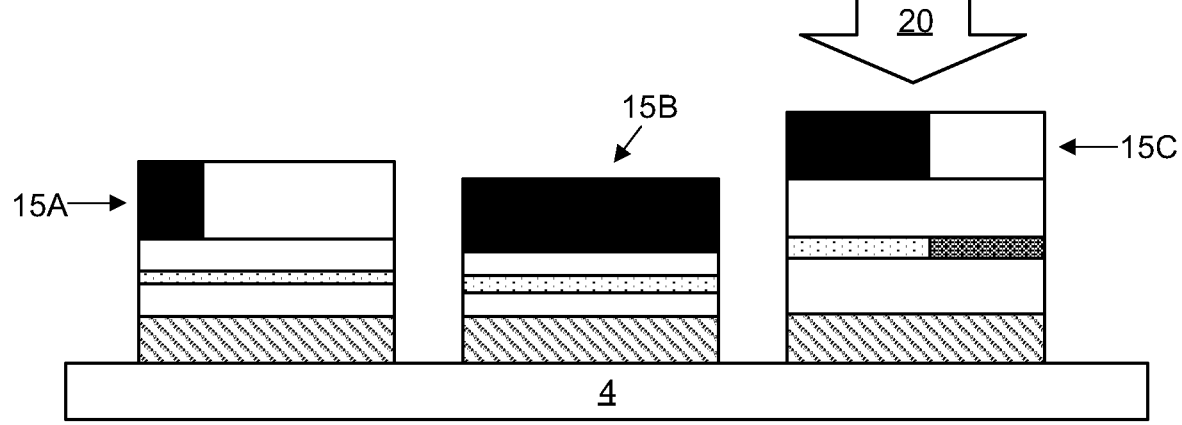

An example process flow of this type is depicted in FIGS. 5-7. FIG. 5 depicts three pixel elements 2A-2C having the same sequence of layers as the pixel elements 2A-2C of FIG. 1 but with the brightness control layer 15A-15C not yet modified. The brightness control layer 15A-15C is uniformly opaque in each of the three pixel elements 2A-2C at the stage depicted in FIG. 5. In a subsequent step, depicted in FIG. 6, selected pixel elements 2A and 2C are irradiated 20 in such a way that the transmittance per unit area with respect to visible light is increased in a portion of the brightness control layer 15A-15C of each of the pixel elements 2A and 2C (the white region indicating where the transmittance has been increased and the black region indicating where the transmittance has not been increased). In an embodiment, the transmittance is increased by removing a portion of the brightness control layer 15A-15C (e.g. by evaporation/ablation) or otherwise locally damaging the brightness control layer 15A-15C in a way which increases transmittance. The increase in transmittance may be limited to only a portion of the brightness control layer in a pixel element by directing a higher concentration of the radiation onto that portion relative to other portions of the brightness control layer in the pixel element. The irradiation 20 may thus be spatially non-uniform within the brightness control layer of a pixel element for one or more of the pixel elements. In a subsequent step, depicted in FIG. 7, the colour control layer 13C in pixel element 2C is modified by irradiating that pixel element 2C. The process flow can be varied to achieve any desired combination of modification of the brightness control layer 15A-15C and colour control layer 13A-13C of the pixel elements 2A-2C.

In other embodiments, the brightness control layer 15A-15C in each pixel element 2A-2C is initially transparent (high transmittance) and the modification of the brightness control layer 15A-15C comprises decreasing the transmittance per unit area with respect to visible light, optionally of a selected portion of the brightness control layer 15A-15C, for at least a subset of the pixel elements 2A-2C.

Figure 8:
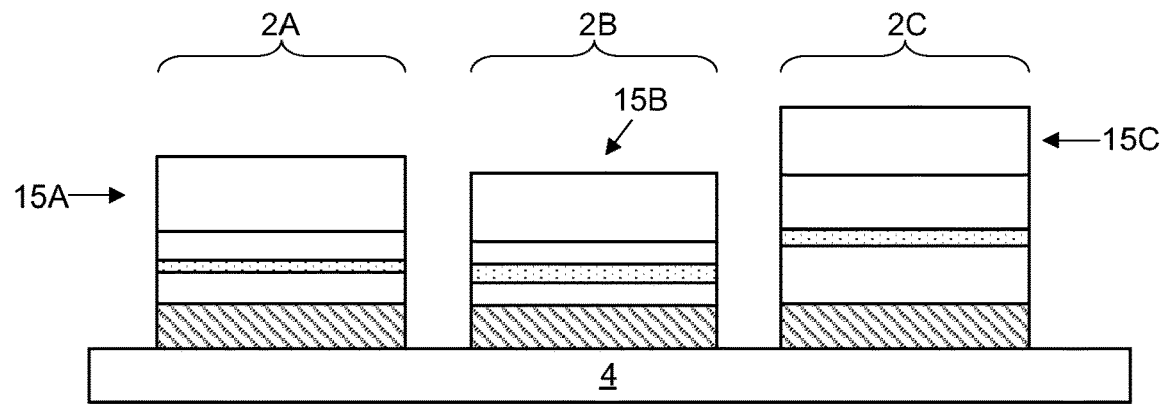
FIGS. 8-10 are side sectional views of a group of three pixel elements of an optical device depicting an example process flow for forming a pattern in the optical device by irradiation of colour control layers and brightness control layers starting from transparent brightness control layers.
Figure 9:
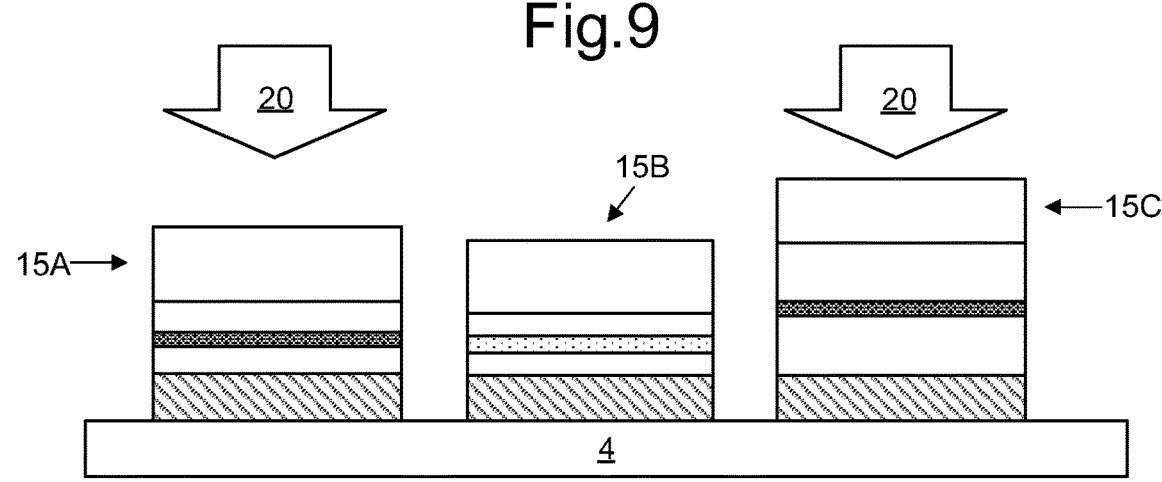
Figure 10:
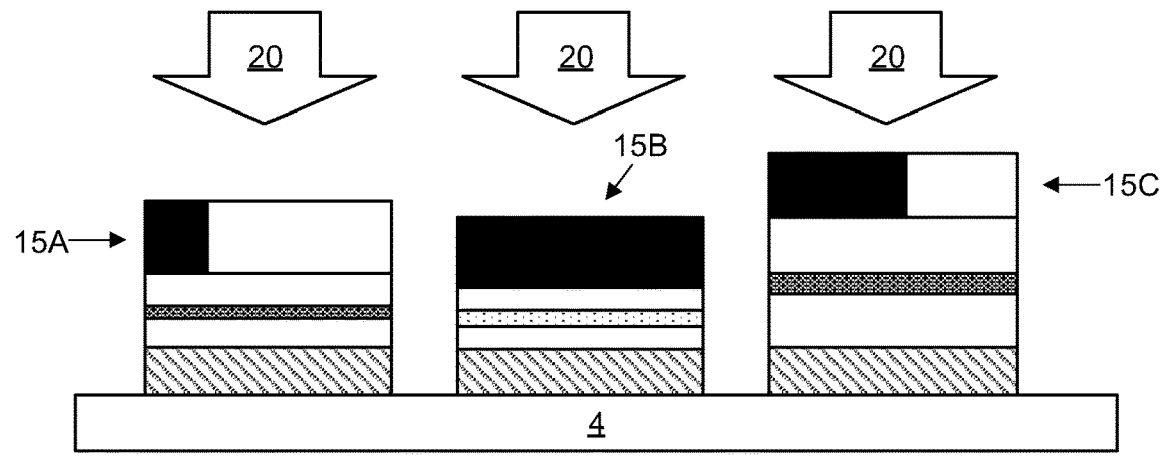

An example process flow of this type is depicted in FIGS. 8-10. FIG. 8 depicts three pixel elements 2A-2C have the same sequence of layers as the pixel elements 2A-2C of FIG. 1 but with the brightness control layer 15A-15C not yet modified. The brightness control layer 15A-15C is uniformly transparent in each of the three pixel elements 2A-2C at the stage depicted in FIG. 8. In a subsequent step, depicted in FIG. 9, selected pixel elements 2A and 2C are irradiated 20 in such a way that the colour control layer is modified in pixel elements 2A and 2C (e.g. to switch pixel element 2A from white to red and to switch pixel element 2C from white to green). In a subsequent step, depicted in FIG. 10, pixel elements 2A-2C are irradiated in such a way that the transmittance per unit area with respect to visible light is decreased uniformly in the brightness control layer 15B of pixel element 2B and decreased in a selected portion of the brightness control layer 15A and 15C of pixel elements 2A and 2C (the white region indicating where the transmittance has not been decreased and the black region indicating where the transmittance has been decreased). In an embodiment, the transmittance is decreased by locally modifying the brightness control layer 15A-15C by oxidation, carbonisation or by any other energy activated chemical reaction or degradation. The process flow can be varied to achieve any desired combination of modification of the brightness control layer 15A-15C and colour control layer 13A-13C of the pixel elements 2A-2C.

In embodiments of the type discussed above with reference to FIGS. 8-10, where the brightness control layer 15A-15C is initially transparent, the modification of the colour control layer 13A-13C may be performed using radiation that passes through the brightness control layer 15A-15C without modifying the brightness control layer 15A-15C (e.g. by choosing a wavelength for which the brightness control layer 15A-15C is highly transparent and/or a radiation dose that is insufficient to cause significant modification of the brightness control layer 15A-15C). A different wavelength and/or intensity of radiation may then be used for the subsequent step of modifying the brightness control layer 15A-15C.

In an embodiment, the depositing of energy into the colour control layer 13A-13C and into the brightness control layer 15A-15C is performed by irradiating the colour control layer 13A-13C and the brightness control layer 15A-15C. In an embodiment, detectable positioning markers (which may also be referred to as fiducials) are provided to enable automated alignment of a radiation source (e.g. a laser). In embodiments of this type, the depositing of energy using radiation may comprise detecting the positioning markers and using the detected positions to direct the radiation to correctly deliver the energy where it is needed.

In an embodiment, energy pulses of radiation are applied with a spot size corresponding to a spatial resolution required to provide the intermediate brightness control discussed above (e.g. to modify less than all of the brightness control layer 15A-15C of each of one or more of the pixel elements 2A-2C). In an embodiment, a beam scanning arrangement is provided to allow a beam spot to be rastered over all of the pixel elements 2A-2C to be switched to provide a desired image. Alternatively, a projection type apparatus may be provided that delivers a spatially modulated "image" pulse that switches multiple pixel elements 2A-2C at the same time. In an embodiment, different spatial distributions of radiation are applied to each pixel element 2A-2C when modifying the brightness control layer 15A-15C in comparison to when the colour control layer 13A-13C is being modified. In particular, the spatial distribution may be substantially uniform over the pixel element 2A-2C when modifying the colour control layer 13A-13C and non-uniform over the pixel element 2A-2C when modifying the brightness control layer 15A-15C. The non-uniform spatial distribution for the brightness control layer 15A-15C may, for example, result in removal of only a portion of the brightness control layer 15A-15C in each of one or more pixel elements 2A-2C and/or modification of a transmittance with respect to visible light (increase or decrease) in only a portion of each of one or more pixel elements 2A-2C. A non-uniform spatial distribution may, however, also be used for modifying the colour control layer 13A-13C, for example to achieve intermediate states between different available colour states controlled by the colour control layer 13A-13C. For example, if a pixel element 2A-2C is configured to be switchable by complete switching of the colour control layer 13A-13C between red and white, a non-uniform spatial distribution may be used to create a pixel that appears red in part of the pixel element and white in the other part of the pixel element, thereby achieving a paler version of red than would be achieved if all of the colour control layer 13A-13C were uniformly switched to the state corresponding to red.

In an embodiment, the depositing of energy into the colour control layer 13A-13C is performed by irradiating the colour control layer 13A-13C from a first side of the optical device (e.g. from below in the orientation of FIG. 1) and the depositing of energy into the brightness control layer 15A-15C is performed by irradiating the brightness control layer 15A-15C from a second side of the optical device (e.g. from above in the orientation of FIG. 1), opposite to the first side. In this case, where the stack of layers in each pixel element 2A-2C comprises a reflective layer 11A-11C and a spacer layer 12A-12C between the reflective layer 11A-11C and the colour control layer 13A-13C (as discussed below and exemplified in FIG. 1 for example), the brightness control layer 15A-15C of each stack may be provided on a side of the colour control layer 13A-13C opposite to the reflective layer 11A-11C and the first side of the optical device may be on the opposite side of the reflective layer 11A-11C to the colour control layer 13A-13C. In embodiments of this type, the irradiating of the colour control layer 13A-13C from the first side of the optical device may comprise depositing energy into the reflective layer 11A-11C, with the reflective layer 11A-11C acting to spread the energy as heat laterally within the reflective layer 11A-11C and thereby increase a spatial uniformity of heating applied to the colour control layer 13A-13C from the irradiation. This effect can mitigate for non-uniformity of intensity within the laser spot. In some embodiments, the reflective layer 11A-11C is patterned to at least partially isolate (e.g. by providing a discontinuity in the material of the reflective layer 11A-11C, such as a line of material having a lower thermal conductivity, that inhibits flow of heat across the discontinuity) a reflective region corresponding to each of two or more of the pixel elements 2A-2C from reflective regions corresponding to other pixel elements 2A-2C. Where such patterning exists, the heat spreading effect of the reflective layer 11A-11C may be locally constrained to each pixel element 2A-2C, thereby additionally decreasing cross-talk between actuation of neighbouring pixel elements 2A-2C (e.g. where heating intended for one pixel element 2A-2C spreads into one or more neighbouring pixel elements 2A-2C). The reflective layer 11A-11C may be coated on the lower side with a highly absorbing material or previously deposited layer, or may have its lower surface roughened, so the layer may appear reflective from above, but absorbing (black) from below, so as to assist in the absorption of the switching energy when illuminated from below.

The PCM in each pixel element 2A-2C is switchable between a plurality of stable states having different refractive indices relative to each other. In an embodiment, the switching is reversible. Each stable state has a different refractive index (optionally including a different imaginary component of the refractive index, and thereby a different transmittance/absorbance) relative to each of the other stable states. In an embodiment all layers in each pixel element 2A-2C are solid-state and configured so that their thicknesses as well as refractive index and absorption properties combine so that the different states of the PCM result in different, visibly and/or measurably distinct, reflection spectra. Optical devices of this type are described in Nature 511, 206-211 (10 Jul. 2014), WO2015/097468A1, WO2015/097469A1, EP3203309A1 and PCT/GB2016/053196.

In an embodiment the PCM comprises, consists essentially of, or consists of, one or more of the following: an oxide of vanadium (which may also be referred to as $VO_x$); an oxide of niobium (which may also be referred to as $NbO_x$); an alloy or compound comprising Ge, Sb, and Te; an alloy or compound comprising Ge and Te; an alloy or compound comprising Ge and Sb; an alloy or compound comprising Ga and Sb; an alloy or compound comprising Ag, In, Sb, and Te; an alloy or compound comprising In and Sb; an alloy or compound comprising In, Sb, and Te; an alloy or compound comprising In and Se; an alloy or compound comprising Sb and Te; an alloy or compound comprising Te, Ge, Sb, and S; an alloy or compound comprising Ag, Sb, and Se; an alloy or compound comprising Sb and Se; an alloy or compound comprising Ge, Sb, Mn, and Sn; an alloy or compound comprising Ag, Sb, and Te; an alloy or compound comprising Au, Sb, and Te; and an alloy or compound comprising Al and Sb (including the following compounds/alloys in any stable stoichiometry: GeSbTe, $VO_x$, $NbO_x$, GeTe, GeSb, GaSb, AgInSbTe, InSb, InSbTe, InSe, SbTe, TeGeSbS, AgSbSe, SbSe, GeSbMnSn, AgSbTe, AuSbTe, and AlSb). Preferably, the PCM comprises one of $Ge_2Sb_2Te_5$ and $Ag_3In_4Sb_{76}Te_{17}$. It is also understood that various stoichiometric forms of these materials are possible: for example $Ge_xSb_yTe_z$; and another suitable material is $Ag_3In_4Sb_{76}Te_{17}$ (also known as AIST). Furthermore, any of the above materials can comprise one or more dopants, such as C or N. Other materials may be used.

PCMs are known that undergo a drastic change in both the real and imaginary refractive index when switched between amorphous and crystalline phases. The switching can be achieved by heating induced by a light pulse from a laser light source. There is a substantial change in the refractive index when the material is switched between amorphous and crystalline phases. The material is stable in either state. Switching can be performed an effectively limitless number of times. However, it is not essential that the switching is reversible.

Although some embodiments described herein mention that the PCM is switchable between two states such as crystalline and amorphous phases, the transformation could be between any two solid phases, including, but not limited to: crystalline to another crystalline or quasi-crystalline phase or vice-versa; amorphous to crystalline or quasi-crystalline/semi-ordered or vice versa, and all forms in between. Embodiments are also not limited to just two states.

The reflective layer 11A-11C may be made highly reflective (e.g. for all visible wavelength radiation) or only partially reflective. In an embodiment, the reflective layer 11A-11C comprises reflective material such as a metal. Metals are known to provide good reflectivity (when sufficiently thick). The reflective layer 11A-11C may have a reflectance of 50% or more, optionally 90% or more, optionally 99% or more, with respect to visible light, infrared light, and/or ultraviolet light. The reflective layer 11A-11C may comprise a thin metal film, composed for example of Au, Ag, Al, or Pt. If this layer is to be partially reflective then a thickness in the range of 5 to 15 nm might be selected, otherwise the layer is made thicker, such as 100 nm, to be substantially totally reflective. In an embodiment, the reflective layer 11A-11C spans uniformly across a plurality of the pixel elements 2A-2C, optionally across all of the pixel elements 2A-2C. Alternatively, the reflective layer 11A-11C may be patterned so as to have a distinct reflective region corresponding to each of two or more of the pixel elements 2A-2C (optionally all of the pixel elements 2A-2C).

The spacer layer 12A-12C and the capping layer 14A-14C are both optically transmissive, and are ideally as transparent as possible. Each of the spacer layer 12A-12C and the capping layer 14A-14C may consist of a single layer or comprise multiple layers having different refractive indices relative to each other. The thickness and refractive index of the material or materials forming the spacer layer 12A-12C and the capping layer 14A-14C are chosen to create a desired spectral response (via interference and/or absorption). Materials which may be used to form the spacer layer 12A-12C and/or the capping layer 14A-14C may include (but are not limited to) ZnO, $TiO_2$, $SiO_2$, $Si_3N_4$, TaO, ITO, and $ZnS$—$SiP_2$.

In some embodiments, the PCM is provided as a plurality of sub-layers of phase change material (optionally separated from each other by a non-PCM layer) in each of two or more of the pixel elements 2A-2C. In such embodiments, the energy may be deposited selectively into different combinations of the sub-layers in different pixel elements 2A-2C to provide a wider variety of visual effects. For example, the sub-layers may be configured such that it is possible to switch a single pixel element type selectively into more than two different colours. For example, a single pixel element type can be switched in this way to provide all of the options described above in relation to different pixel element types: for example, the single pixel element type could be selectively made to switch between white and each of a plurality of different colours (e.g. three different colours or more) and/or to switch between another colour than white and each of a plurality of different colours (e.g. three different colours or more). Providing a single pixel element type having this wider flexibility reduces or eliminates the need to have pixel elements of multiple different pixel element type in order to achieve a desired colour capability, thus simplifying manufacture. This approach may be implemented with or without the brightness control layer being present in the pixel elements.

The brightness control layer 15A-15C may be deposited on the capping layer 14A-14C directly (as depicted in the examples) or on an intermediate layer (e.g. a planarizing layer or an encapsulation layer) provided on top of the capping layer 14A-14C. Optionally, a planarization layer or encapsulation layer may additionally be added after (so as to be on top of) the brightness control layer 15A-15C.

In some embodiments, the colour control layer 13A-13C is deposited from an ink. The ink is printed in a pattern to form the colour control layer 13A-13C. The ink may be printed using an ink-jet printing technique for example. The ink may be printed on a planar or non-planar surface. The approach may be particularly advantageous when applied to a non-planar surface where it may be difficult to obtain a high level of uniformity using alternative techniques such as sputtering. As exemplified in FIGS. 11 and 12, the ink 30A, 30B may comprise a liquid medium 32 and a suspension of micro-stacks 34A, 34B comprising phase change material. Once the printing is completed, the liquid medium dries and leaves behind the micro-stacks. The micro-stacks 34A, 34B may be provided by forming a larger stack (e.g. using sputtering) and processing the larger stack to form the micro-stacks (e.g. by comminuting the larger stack using known grinding techniques for example). In some embodiments, the micro-stacks 34A, 34B are functionalized to promote homogeneous dispersion of the micro-stacks 34A, 34B in the liquid medium 32 (e.g. to discourage clumping together of the micro-stacks). The composition of the liquid medium 32 and/or nature of the functionalization are not particularly limited. Each micro-stack 34A, 34B comprises at least one layer of phase change material. Each micro-stack 34A, 34B may comprise one or more further layers, including any of the layers described above with reference to FIGS. 1-10, including a reflector layer (e.g. a metallic layer), capping layer and/or spacer layer. In some embodiments, as exemplified in FIGS. 11 and 12, each micro-stack 34A, 34B is mirror symmetric relative to a reflector layer 36 in the micro-stack 34A, 34B, with at least one layer of phase change material being provided on each side of the reflector layer 36 in a further stack 37. The further stack 37 may comprise any combination of the layers mentioned above (e.g. spacer layer, phase change material layer and/or capping layer). In one embodiment, each further stack comprises a phase change material layer sandwiched between two spacer layers, for example as described above with reference to FIGS. 1 and 5-10. Configuring the micro-stacks to be mirror symmetric in this manner means that the micro-stacks do not need to be deposited in a particular orientation (both orientations will provide the same optical effects).

In some embodiments, as exemplified in FIGS. 11 and 12, a plurality of the inks 30A, 30B are provided. Each ink 30A, 30B comprises a different respective type of micro-stack 34A, 34B. Each different type of micro-stack 34A, 34B is configured to provide a different range of effects on the colour of light leaving the optical device. Micro-stacks 34A, 34B of different type may, for example, comprise layers having different composition and/or thickness to provide different interference effects (e.g. with spacer layers having different thicknesses). As depicted in FIG. 13, each ink 30A, 30B may be printed in a different pattern to provide a plurality of groups 38 of pixel elements 2A, 2B. Each group 38 comprises at least two pixel elements 2A, 2B comprising micro-stacks of different respective types (e.g. to provide different respective primary colours). As mentioned above, this may allow full colour displays to be provided without requiring separate sputtering, litho and etching steps for each primary colour.

The invention claimed is:

1. A method of forming a pattern on an optical device, wherein:
   the optical device comprises a plurality of pixel elements, each pixel element comprising a stack of layers that includes a color control layer and a brightness control layer superposed over each other in a viewing direction; and
   the method comprises, for each of one or more of the pixel elements:
   depositing energy into the color control layer of the pixel element to modify the color control layer and thereby change an effect of the color control layer on the color of light leaving the optical device from the pixel element in use; and
   depositing energy into the brightness control layer of the pixel element to modify the brightness control layer and thereby change an effect of the brightness control layer on the intensity of light leaving the optical device from the pixel element in use, wherein:
   the depositing of energy into the color control layer is performed by irradiating the color control layer; and
   the depositing of energy into the brightness control layer is performed by irradiating the brightness control layer.

2. The method of claim 1, wherein for each of one or more of the pixel elements, the irradiation of the brightness control layer is spatially non-uniform within the pixel element.

3. The method of claim 1, wherein:
   the irradiation of the color control layer to modify the color control layer is performed through the brightness control layer prior to the modification of the brightness control layer; and
   the irradiation of the color control layer is performed using radiation that modifies the color control layer without modifying the brightness control layer.

4. The method of claim 1, wherein:
   the irradiation of the color control layer is performed from a first side of the optical device; and
   the irradiation of the brightness control layer is performed from a second side of the optical device, opposite to the first side.

5. The method of claim 4, wherein:
   the stack of layers in each pixel element further comprises a reflective layer and a spacer layer between the reflective layer and the color control layer;
   the brightness control layer of each stack is provided on a side of the color control layer opposite to the reflective layer; and the first side of the optical device is on the side of the reflective layer opposite to the color control layer.

6. The method of claim 5, wherein:
the irradiating of the color control layer from the first side of the optical device comprises depositing energy into the reflective layer, the reflective layer acting to spread the energy as heat laterally within the reflective layer;
the reflective layer is patterned to at least partially isolate a reflective region corresponding to each of two or more of the pixel elements from reflective regions corresponding to pixel elements other than that pixel element.

7. A method of forming a pattern on an optical device, wherein:
the optical device comprises a plurality of pixel elements, each pixel element comprising a stack of layers that includes a color control layer and a brightness control layer superposed over each other in a viewing direction; and
the method comprises, for each of one or more of the pixel elements:
depositing energy into the color control layer of the pixel element to modify the color control layer and thereby change an effect of the color control layer on the color of light leaving the optical device from the pixel element in use; and
depositing energy into the brightness control layer of the pixel element to modify the brightness control layer and thereby change an effect of the brightness control layer on the intensity of light leaving the optical device from the pixel element in use, wherein:
the color control layer comprises a phase change material switchable between a plurality of stable states having different refractive indices relative to each other; and
the depositing of energy into the color control layer of each pixel element is arranged to switch the color control layer in the pixel element from one of the states to another of the states, and wherein the stack of layers in each pixel element further comprises a reflective layer and a spacer layer between the reflective layer and the color control layer.

8. The method of claim 7, wherein the pixel elements are provided as a plurality of groups and each group of pixel elements comprises at least two pixel elements having spacer layers of different thickness, such that each of the pixel elements in the group provides a different range of effects on the color of light leaving the optical device from the pixel element than the other pixel element or pixel elements in the group.

9. A method of forming a pattern on an optical device, wherein:
the optical device comprises a plurality of pixel elements, each pixel element comprising a stack of layers that includes a color control layer and a brightness control layer superposed over each other in a viewing direction; and
the method comprises, for each of one or more of the pixel elements:
depositing energy into the color control layer of the pixel element to modify the color control layer and thereby change an effect of the color control layer on the color of light leaving the optical device from the pixel element in use; and
depositing energy into the brightness control layer of the pixel element to modify the brightness control layer and thereby change an effect of the brightness control layer on the intensity of light leaving the optical device from the pixel element in use, wherein:
the color control layer comprises a phase change material switchable between a plurality of stable states having different refractive indices relative to each other; and
the depositing of energy into the color control layer of each pixel element is arranged to switch the color control layer in the pixel element from one of the states to another of the states, and wherein the stack of layers in each pixel element further comprises a reflective layer and the brightness control layer of each stack is provided on a side of the color control layer opposite to the reflective layer.

10. A method of forming a pattern on an optical device, wherein:
the optical device comprises a plurality of pixel elements, each pixel element comprising a stack of layers that includes a color control layer and a brightness control layer superposed over each other in a viewing direction; and
the method comprises, for each of one or more of the pixel elements:
depositing energy into the color control layer of the pixel element to modify the color control layer and thereby change an effect of the color control layer on the color of light leaving the optical device from the pixel element in use; and
depositing energy into the brightness control layer of the pixel element to modify the brightness control layer and thereby change an effect of the brightness control layer on the intensity of light leaving the optical device from the pixel element in use, wherein:
the color control layer comprises a phase change material switchable between a plurality of stable states having different refractive indices relative to each other; and
the depositing of energy into the color control layer of each pixel element is arranged to switch the color control layer in the pixel element from one of the states to another of the states, and further comprising forming the color control layer prior to the depositing of energy into the color control layer by:
providing an ink comprising a liquid medium and a suspension of micro-stacks comprising phase change material; and
printing the ink in a pattern to form the color control layer.

11. The method of claim 10, wherein each micro-stack is mirror symmetric relative to a reflector layer in the micro-stack, with at least one layer of phase change material on each side of the reflector layer.

12. The method of claim 11, wherein each micro-stack comprises a plurality of sub-layers of phase change material on each side of the reflector layer.

13. The method of claim 10, further comprising functionalizing the micro-stacks in the liquid medium to promote homogeneous dispersion of the micro-stacks in the liquid medium.

14. The method of claim 10, wherein the ink is printed using an ink-jet printing technique.

15. The method of claim 10, wherein the ink is printed onto a non-planar surface.

16. The method of claim 10, wherein:
a plurality of the inks are provided, each ink comprising a different respective type of micro-stack, each different type of micro-stack being configured to provide a different range of effects on the color of light leaving the optical device; and each ink is printed in a different pattern to provide a plurality of groups of pixel elements, each group comprising at least two pixel elements comprising micro-stacks of different respective types.

17. A method of forming a pattern on an optical device comprising a plurality of pixel elements, the method comprising:
providing an ink comprising a liquid medium and a suspension of micro-stacks comprising phase change material, the phase change material being switchable between a plurality of stable states having different refractive indices relative to each other; and
printing the ink in a pattern to form a color control layer in each of the pixel elements.

18. The method of claim 17, further comprising depositing energy into the color control layer of each of one or more of the pixel elements to modify the color control layer and thereby change an effect of the color control layer on the color of light leaving the optical device from the pixel element in use.

* * * * *